July 25, 1961  G. A. JELLEY  2,993,967
CONTACTOR-OPERATED MOTOR STARTERS
Filed Sept. 9, 1958  6 Sheets-Sheet 1

Inventor
Gordon Albert Jelley
By
Attorney

July 25, 1961 G. A. JELLEY 2,993,967
CONTACTOR-OPERATED MOTOR STARTERS
Filed Sept. 9, 1958 6 Sheets-Sheet 2
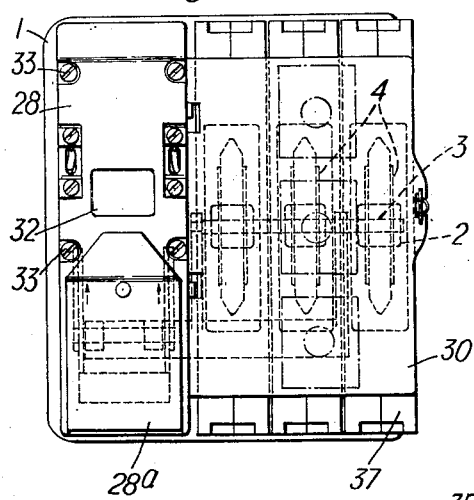
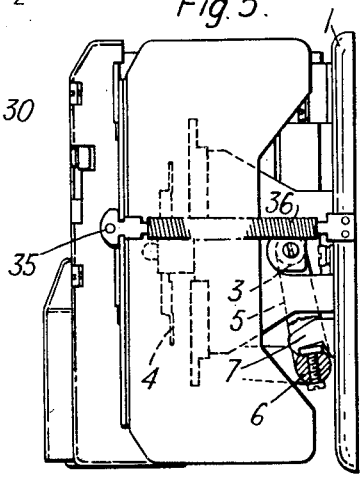
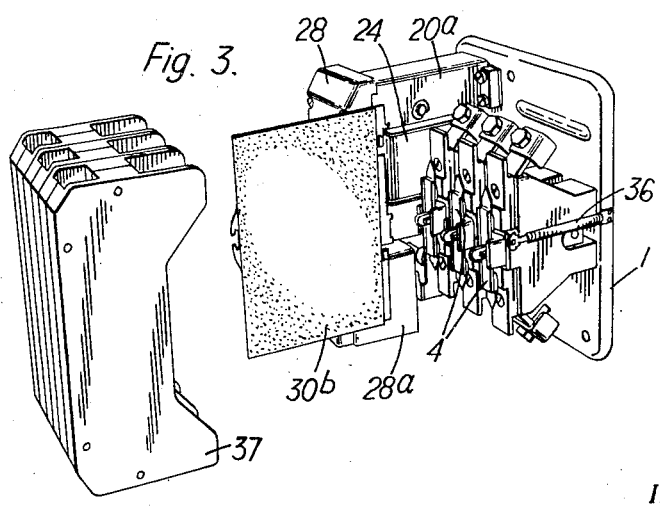
Inventor
Gordon Albert Jelley
By
Attorney

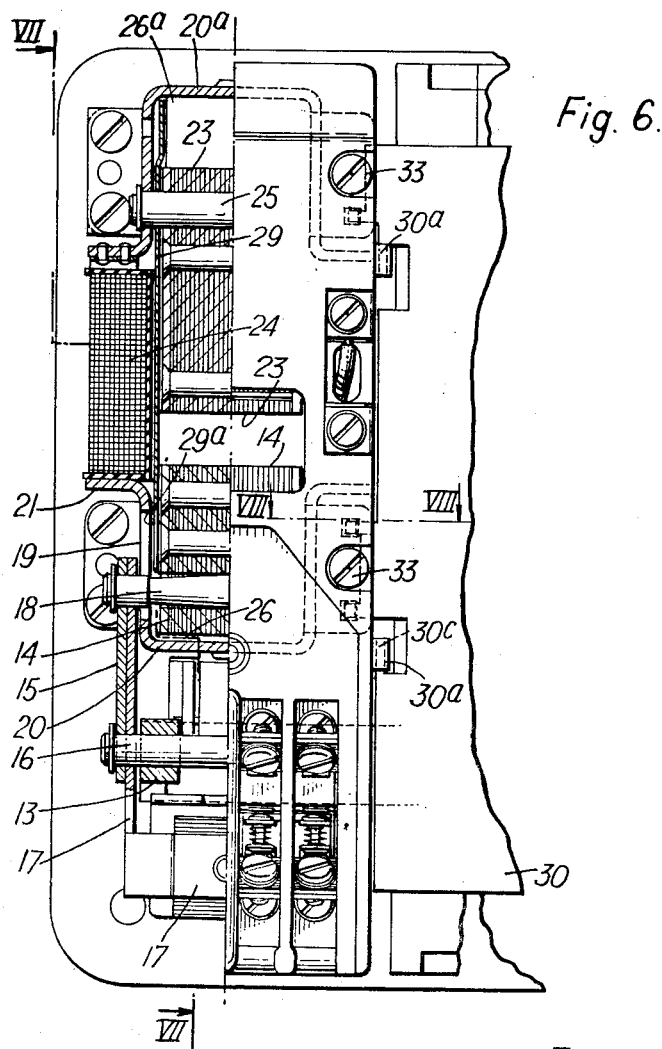
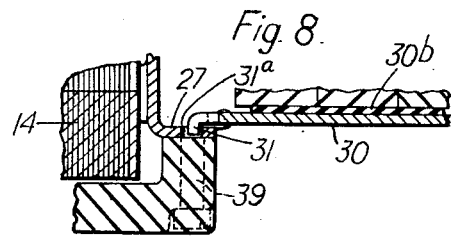

July 25, 1961  G. A. JELLEY  2,993,967
CONTACTOR-OPERATED MOTOR STARTERS
Filed Sept. 9, 1958  6 Sheets-Sheet 4

July 25, 1961 G. A. JELLEY 2,993,967
CONTACTOR-OPERATED MOTOR STARTERS
Filed Sept. 9, 1958 6 Sheets-Sheet 5
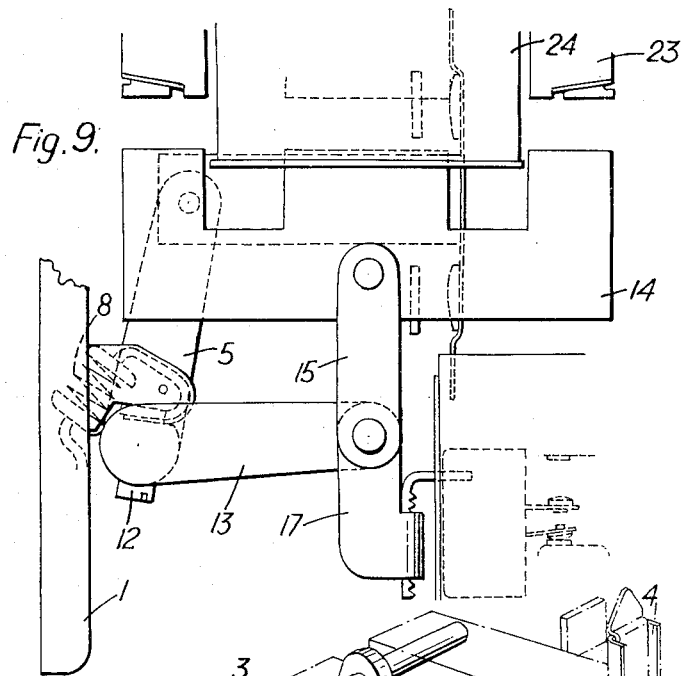
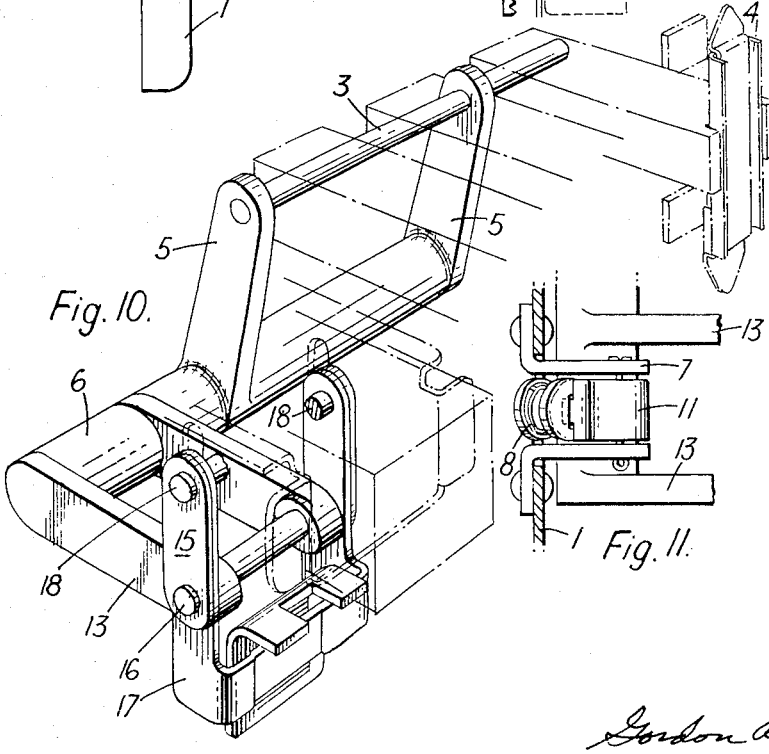
Inventor
Gordon Albert Jelley
By
Attorney

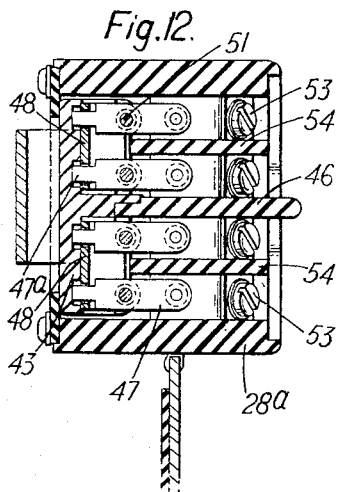
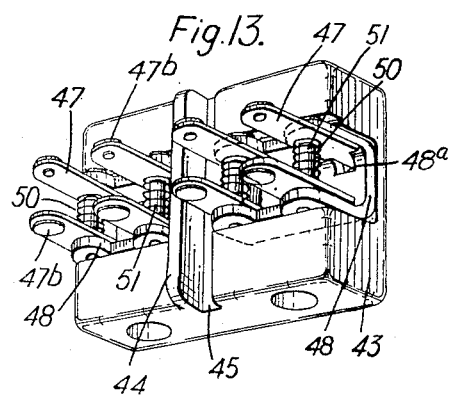
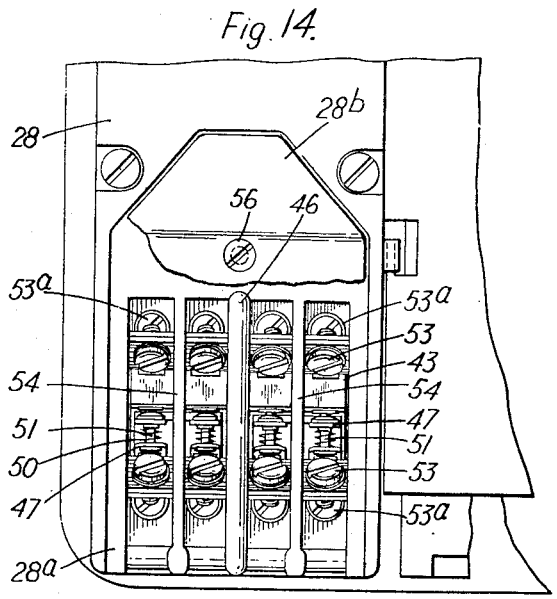

United States Patent Office 2,993,967
Patented July 25, 1961

2,993,967
CONTACTOR-OPERATED MOTOR STARTERS

Gordon Albert Jelley, Walsall, England, assignor to J. A. Crabtree & Co. Limited, Walsall, England, a British company
Filed Sept. 9, 1958, Ser. No. 759,969
Claims priority, application Great Britain Sept. 16, 1957
14 Claims. (Cl. 200—104)

This invention relates to improvements in contact-operated motor starters and has for its object to provide an improved arrangement of simple construction for facilitating access to the parts for their inspection or replacement without disturbing the wiring connections.

According to this invention a hinged cover plate for the contacts may be provided with means such as push buttons, pilot lights or an auxiliary switch. The plate may also act for retaining a removable arc shield for the contacts. A hinged cover may also be provided for the coil and magnet structure, and this cover and the cover plate for the contacts may have a common hinge, to enable them to be opened and closed independently. The plate and cover may be hingedly mounted as a unit on a frame member of the contactor. Thus the contacts and the magnet and coil may be examined or replaced from the front without interference with the wiring and without necessitating the removal of the starter from its panel or mounting. The magnet and the armature are mounted in similarly shaped brackets provided with shock absorbent pads, and the cover, which may be formed with a box portion for accommodating auxiliary contacts, is adapted to be secured in position on the front of these brackets. Thus the push buttons for actuating the starter may be mounted on the plate, and the auxiliary contacts on the cover; the wiring remains connected when either plate or cover is opened. The means for transmitting movement of the armature to the main contacts is adapted also for actuating the auxiliary contacts which may comprise pairs of contact plates separated by compression springs and pivotally mounted in a cradle secured in an insulating carrier.

In order to enable the invention to be readily understood reference will now be made to the accompanying drawings illustrating by way of example one construction for carrying the invention into effect, in which drawings:

FIGURE 3 is a perspective view with the plate in the open position and showing the arc shield removed from the switch.

FIGURE 4 is a front elevation of FIGURE 1 with the cover in the closed position.

FIGURE 5 is a side elevation of FIGURE 4.

FIGURE 6 is a front sectional elevation to a larger scale of the left hand side of the apparatus.

FIGURE 8 is a section to an enlarged scale on the line VIII—VIII of FIGURE 6.

FIGURE 9 is a side elevation to a larger scale of the transmission mechanism actuated by the armature.

FIGURE 10 is a perspective view of parts of the mechanism shown in FIGURE 9.

FIGURE 11 is a sectional plan of a part of FIGURE 9.

FIGURE 12 is a section on the line XII—XII of FIGURE 7.

FIGURE 13 is a perspective view of the auxiliary contact mechanism; and

FIGURE 14 is a front elevation of the lower part of FIGURE 7 with a portion of the cover removed.

Figure 7:
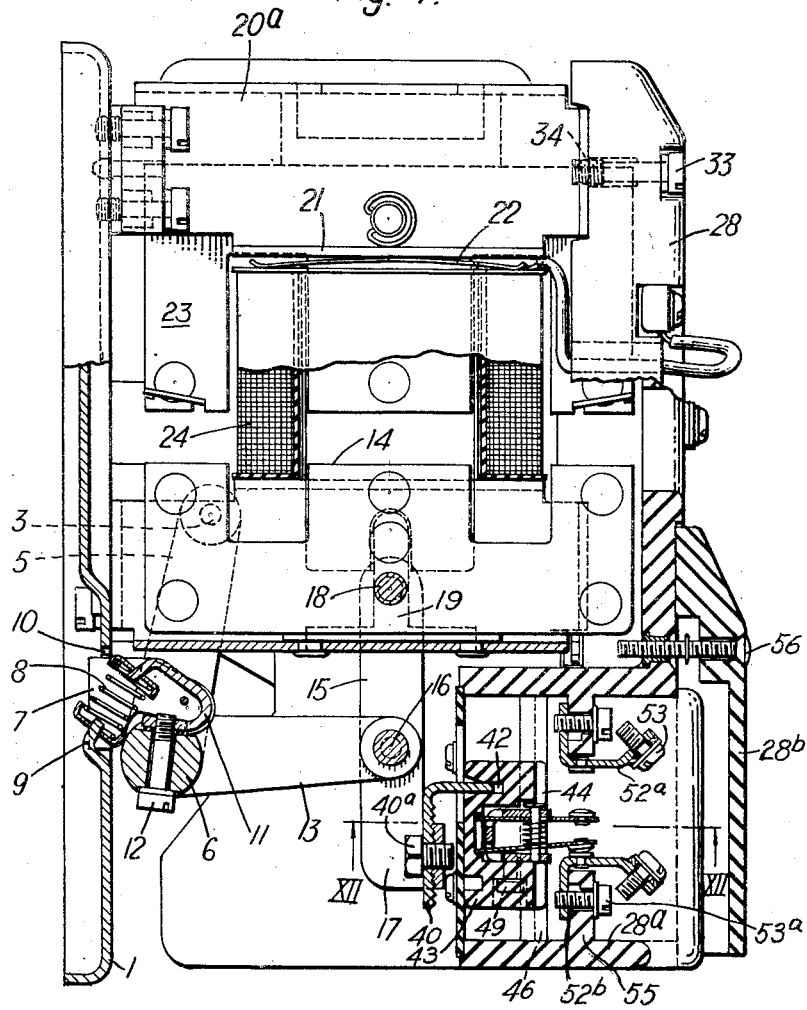
FIGURE 7 is a sectional elevation on the line VII—VII of FIGURE 6.

Referring to the drawings the motor starter comprises a back plate 1 on which are mounted contact carriers 2 of the construction described in copending application Serial No. 759,987. The transmission rod 3 for the moving contacts 4 passes through openings in the free ends of a pair of cranks 5 integral with an arm 6 pivotally mounted on the back plate 1. Each of the two mountings for the arm 6 is disposed in a rectangular opening 10, see FIG. 7 in the plate and comprises a pair of small hook-shaped supports 7 welded to the back plate and short helical compression springs 8 operative between a lug 9 bent rearwardly from the opening 10 and one end of a loop-shaped member 11 disposed between the supports 7. The other end of each member 11 is secured by a screw 12 to a flattened part of the arm 6.

The provision of pivot edge bearings avoids the necessity for accurately produced sleeve bearings and the springs associated with them assist the movement of the parts to the "off" position, while maintaining the bearings of the pivot in their seating.

Formed on one end of the arm 6 at approximately 90° to the contact actuating cranks 5 is a second pair of cranks 13 connected with the armature 14 through parallel links 15. The free ends of these cranks have a transverse rod 16 secured to a slide 17 which is driven by the armature through a second rod 18 guided in slots 19 in the lower of a pair of similarly constructed channel frames 20, 20ᵃ.

These frames extend forwardly from one side of the back plate and are formed with flanges 21 for seating the coil 24 between them. An E-shaped magnet 23, see Fig. 6, has its connecting limb secured by a cross pin 25 in the channel of the upper frame 20ᵃ, and the armature 14, which is also of E-shape but with shorter legs than the magnet, is disposed in the channel of the lower frame 20. Shock absorbent pads or blocks 26, 26ᵃ made of nylon for example, are mounted between the frames and the armature and magnet, the centre limbs of which extend into the centre of the coil 24. Leaf springs 22 for absorbing shocks may also be disposed between the seating flanges 21 of the upper frame 20ᵃ and the coil.

The sides of the frames are formed with lateral flanges 27, 27ᵃ for seating a cover 28 for the armature and magnet as hereinafter described. Thin sheet metal guides 29 pass through the coil former to act as guides for the armature. The lower ends of the blades or guides 29 are slotted at 29ᵃ for the passage of the pin 18.

The contacts are covered by a flat metal plate 30 having an inner insulating facing 30ᵇ on the front of which are mounted push buttons 38 for controlling the coil circuit for actuating the contactor. As shown in FIG. 4, one side of this plate is hingedly connected top and bottom at 30ᵃ to the cover 28 which is made of insulating material, for the magnet and armature, the lower part 28ᵃ of this cover being constructed as a box for receiving auxiliary contacts. Each hinge connection is made by a pin formation 30ᶜ on the plate entering a complementary socket 30ᵈ secured by a screw 30ᵉ to the cover. Just above each hinge the metal plate is formed with hooks 31 entering corresponding holes 31ᵃ in the inner lateral flanges of the armature and magnet frames, the hooks entering the holes from the rear so that the flange is disposed between the plate and the cover, to provide a single hinged mounting for both hinged parts.

The cover 28, formed with a window 32 apertured to enable the coil to be observed may be secured in position by screws 33 entered into tapped openings 34 in the flanged seatings of the frames. The metal plate may be secured over the contacts by a catch 35 retained in position by a spring 36 secured to the back plate 1.

Figure 1:
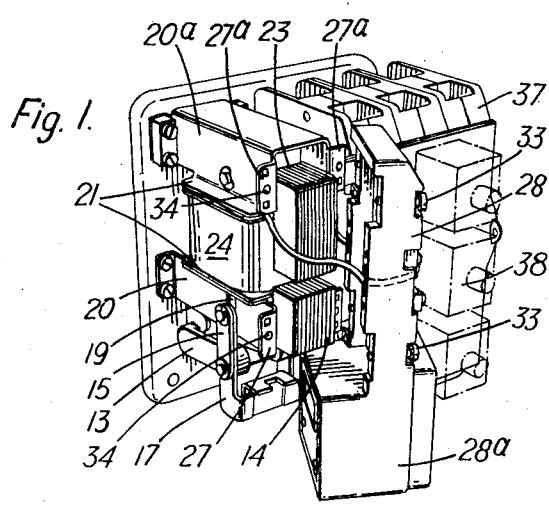
FIGURE 1 is a perspective view of the switch removed from its casing and showing the cover for the coil and magnet in the partly open position.
Figure 2:
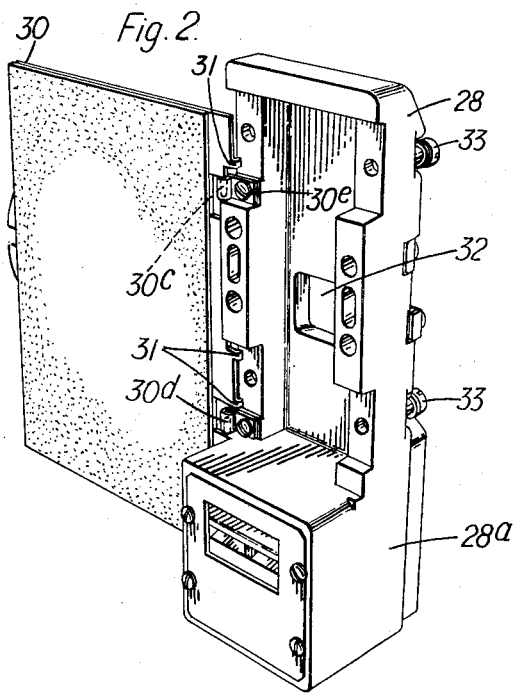
FIGURE 2 is a perspective view from the rear of the cover and hinged plate.

In order to gain access to the contacts the catch 35 is released to enable the plate 30 to be opened to the position shown in FIGURE 3 whereupon the arc shield may be removed. For when it is desired to examine the coil or magnet structure, the screws 33 are loosened to enable the cover to be turned about its hinge mounting to the position shown in FIGURE 1. The opening of the plate and the cover may be performed without interference of the wiring and without requiring the removal of the starter from its panel or mounting.

The improved arrangement enables either the plate or the cover to be independently hinged about its common mounting to enable access to be obtained to the contacts or to the magnet, armature and coil without disturbance of the wiring. In addition the hingedly connected plate and cover may be removed as a unit when desired.

Referring to FIGURES 12, 13 and 14 the box 28ª for housing the auxiliary contacts of a contactor-operated starter is formed on the cover 28 for the magnet 23, armature 14, and coil structure 24.

To the lower end of the slide 17 actuated by the armature 25 is adjustably secured an L-shaped bracket 40 the bifurcated arm 41 of which enters horizontal grooves 42 in the rear of an insulating block 43 slidably guided on the central rib 46 of the box 28ª for the auxiliary contacts. The bracket 40 may be secured in adjusted position on the slider by a screw 40ª, this adjustment enabling compensations in production tolerances.

The front of the block is formed with a vertical rib 44 and groove 45 having guiding engagement with a barrier 46 on the box. The rib also separates pairs of moving contacts 47 on each side of the block, each pair of contacts being assembled in a cradle 48 secured in a recess of the block by a screw 49. Two pairs of moving contact plates are pivotally mounted in each cradle, each plate having a lug 47ª of reduced width at its rear end freely entering an aperture 48ª disposed at the end of the cradle. A helical compression spring 50 is disposed between each pair of plates for the purpose of presssing them outwards against the parallel arms of the cradle, the forward ends of the plates extending beyond the latter, being provided with contact buttons 47ᵇ. A flexible plate, formed with holes through which the rivets pass, may be pressed by the spring into engagement with the contacts in order to provide a bridge between them.

The springs may be centralised by rivets 51 extending between the arms of the cradle. The arrangement enables each plate to be independently pivoted in its cradle against the action of the spring.

The buttons on the plates are engageable with upper and lower sets of fixed contacts 52 each of which comprises a bent arm 52ª to a forwardly sloping part of which is secured a terminal clamp 53, and on a horizontal flat centre portion of which is riveted a contact button. A tapped opening in a vertical rear part 52ᵇ of each member enables each fixed contact to be secured by a screw 53ª to a flat partition 55 on the box. Each pair of upper and lower fixed contacts are separated by the central barriers 46 and intermediate barriers 54 formed in the box. The openings in the partition 55 may have an elliptical portion which may be removed in order to enlarge the openings and enable the screws 53ª to be adjusted for varying the distance between respective pairs of fixed contacts 52.

A removable cover 28ᵇ for the front of the box 28ª may be secured to the latter by a screw 56 and may be formed with flanges on all but its lower side through which cables may be introduced.

I claim:

1. A contactor-operated motor starting switch comprising a back plate, an upper and a lower bracket supported by said plate, a magnet mounted in said upper bracket, an armature disposed in said lower bracket, a coil mounted between said brackets, main contacts disposed on said plate, a removable arc shield for said contacts, a flat retaining plate for said arc shield hinged to said brackets, releasable means for securing said retaining plate to said back plate, an insulating cover for said coil and said magnet hingedly mounted to said brackets, auxiliary contacts, a box disposed on said cover for housing said auxiliary contacts, and transmission means connected to said armature for actuating said main and said auxiliary contacts.

2. A contactor-operated motor starting switch comprising a back plate, an upper bracket and a lower bracket disposed on said back plate, an armature, a magnet, a coil, said armature, magnet and coil supported by said brackets, fixed and moving contacts disposed on said back plate, an arc shield for said contacts, a hinged retaining plate for said shield, a hinged cover for said coil and said magnet, and means for transmitting the movement of said armature to said contacts, said means comprising a pivotal arm mounted on said back plate, a pair of crank arms attached to said pivotal arm, the free end of said crank arms being connected to carriers for said moving contacts.

3. A starting switch according to claim 2 having a second pair of crank arms disposed on said pivotal arm, auxiliary contact mechanism, and a carrier for said mechanism pivotally connected to said second pair of crank arms and driven by said armature.

4. A starting switch according to claim 2 wherein said pivotal arm is mounted upon a pair of hook-shaped supports, said supports being secured to the sides of an opening in said back plate, a lug disposed on said back plate, a loop-shaped member, a compression spring operative between said lug and one end of said member, the other end of said member being secured to said pivotal arm.

5. A contactor type motor starting switch comprising a frame, fixed contacts, moving contacts, a coil, a magnet disposed on said frame and energized by said coil, an armature cooperating with said magnet to actuate said moving contacts, a removable arc shield for said contacts, a retaining plate for said shield, said plate hinged about a vertical axis disposed adjacent the inner side of said shield, and a cover for said coil and said magnet, said cover hinged about a vertical axis disposed adjacent the inner side of the frame.

6. A contactor type motor starting switch comprising a frame, fixed contacts, moving contacts, a coil, a magnet disposed on said frame and energized by said coil, an armature cooperating with said magnet to actuate said moving contacts, a removable arc shield for said contacts, a retaining plate for said shield, a cover for said coil and said magnet, and a vertical hinge disposed at the front of, and between, the sides of the switch for pivotally mounting said plate and said cover.

7. A motor switch according to claim 6, having an auxiliary switch disposed in a housing on said cover, and transmission means connected to said armature for actuating said auxiliary switch.

8. A contactor type motor starting switch comprising a frame, fixed contacts, moving contacts, a coil, a magnet disposed on said frame and energized by said coil, an armature co-operating with said magnet to actuate said moving contacts, a removable arc shield for said contacts, a retaining plate for said shield, and a cover for said coil and said magnet, said plate and cover being hinged about a common vertical axis disposed on the inner side of the front of the frame.

9. A contactor type motor starting switch comprising a frame, fixed contacts, moving contacts, a coil, a magnet disposed on said frame and energized by said coil, an armature co-operating with said magnet to actuate said moving contacts, a removable arc shield for said contacts, a retaining plate for said shield, push buttons for controlling the circuit of said coil mounted on said plate, a cover for said coil and said magnet, said plate and cover being hinged about a vertical axis disposed at the front of and between the sides of the switch.

10. A contactor-operated motor starting switch comprising a back plate, a frame mounted on said back plate, fixed contacts, moving contacts, said fixed and moving contacts supported by said back plate, a coil, a magnet mounted on said frame energized by said coil, an armature adapted to co-operate with said magnet to actuate said moving contacts, a removable arc shield, a flat rectangular retaining plate for said shield, means connected to said back plate to releasably engage said retaining plate, a cover for said coil and said magnet, said plate and cover being hinged about a vertical axis disposed at the front of and between the sides of the switch.

11. A contactor-operated motor starting switch comprising a back plate provided with an upper and a lower bracket secured thereto, a magnet mounted in said upper bracket, an armature disposed in said lower bracket, a coil disposed between said upper and said lower brackets, fixed contacts and moving contacts supported by said back plate, transmission means disposed between said armature and said moving contacts, a removable arc shield, a retaining plate for said shield, and a cover for said coil and said magnet, said retaining plate and cover being hinged about a vertical axis disposed at the front of and between the sides of the switch.

12. A contactor-operated motor starting switch comprising a back plate provided with an upper and a lower bracket secured thereto, a magnet mounted in said upper bracket, an armature disposed in said lower bracket, a coil disposed between said upper and said lower brackets, shock absorbent pads disposed between said magnet, said armature and said brackets, said brackets being of channel formation with flanges extending laterally from the sides thereof, fixed contacts and moving contacts supported by said back plate, transmission means disposed between said armature and said moving contacts, a removable arc shield, a retaining plate hinged to said brackets serving to position said shield relative to said contacts, and a cover for said coil and said magnet hinged to said brackets.

13. A contactor-operated, motor starting switch comprising a frame, fixed contacts, moving contacts, a coil, a magnet supported by said frame and energized by said coil, an armature cooperating with said magnet to actuate said moving contacts, a removable arc shield for said contacts, a retaining plate for said arc shield, a cover for said coil and said magnet, a hinge for pivotally mounting said plate and said cover, said plate and said cover adapted to be independently opened and closed upon said common hinge, an auxiliary switch disposed in a housing on said cover, and transmission means connected to said armature for actuating said auxiliary switch, said auxiliary switch being engaged with and disengaged from said transmission means by opening and closing said hinged cover.

14. A contactor-operated, motor starting switch comprising a frame, fixed contacts, moving contacts, a coil, a magnet supported by said frame and energized by said coil, an armature cooperating with said magnet to actuate said moving contacts, a removable arc shield for said contacts, a retaining plate for said arc shield, a cover for said coil and said magnet, a hinge for pivotally mounting said plate and said cover, said plate and said cover adapted to be independently opened and closed upon said common hinge, an auxiliary switch disposed in a housing on said cover, and transmission means connected to said armature for actuating said auxiliary switch, said auxiliary switch comprising an insulating block readily engageable with and disengageable from said transmission means, cradles mounted upon said block, springs disposed within said cradles, and individual contact plates independently pivoted in said cradles against said springs.

References Cited in the file of this patent

UNITED STATES PATENTS

| | | |
|---|---|---|
| 1,845,514 | O'Keeffe | Feb. 16, 1932 |
| 2,101,288 | Van Valkenburg | Dec. 7, 1937 |
| 2,492,101 | Landmeier | Dec. 20, 1949 |
| 2,523,774 | Moran | Sept. 26, 1950 |
| 2,773,948 | Pelz et al. | Dec. 11, 1956 |
| 2,794,093 | Morschel | May 28, 1957 |
| 2,860,206 | Stock | Nov. 11, 1958 |